Figure 1:
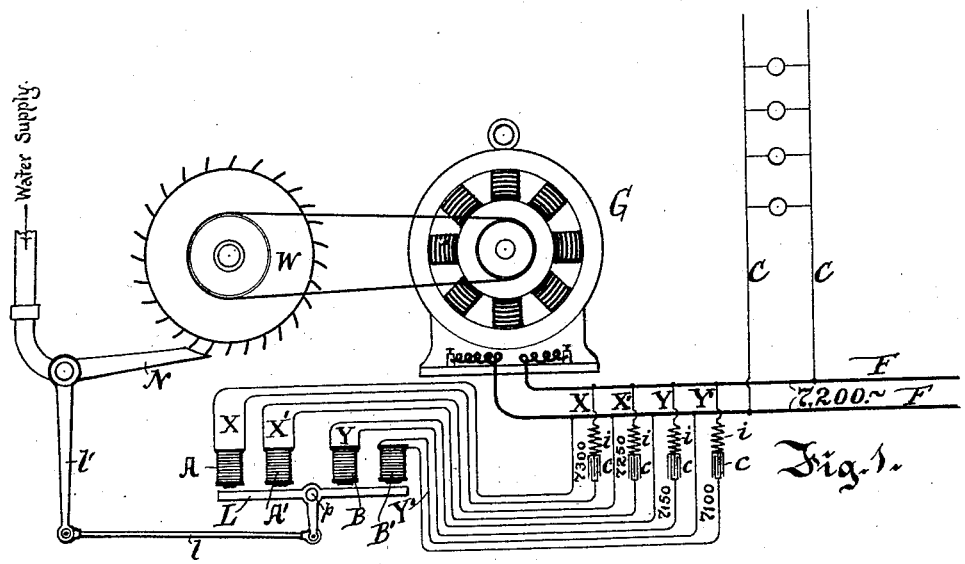

(No Model.)

K. B. MILLER.
ELECTRIC GOVERNOR.

No. 559,187.    Patented Apr. 28, 1896.

Witnesses:
Edward E. Clement.
Wm. N. DeLacy.

Inventor:
Kempster B. Miller.

UNITED STATES PATENT OFFICE.

KEMPSTER B. MILLER, OF WASHINGTON, DISTRICT OF COLUMBIA.

ELECTRIC GOVERNOR.

SPECIFICATION forming part of Letters Patent No. 559,187, dated April 28, 1896.

Application filed February 25, 1896. Serial No. 580,650. (No model.)

*To all whom it may concern:*

Be it known that I, KEMPSTER B. MILLER, a citizen of the United States, residing at Washington, District of Columbia, have invented an Improvement in Electric Governors, of which the following is a specification.

My invention relates to that class of governors which are employed to maintain the source of motive power at a constant speed under a variable load.

It has for its object the production of a governor and a method of governing which will be simple and certain in its action for every change in speed, large or small. To this end I employ regulating means controlled directly by the fluctuation of the periodicity of an alternating current.

The applications of my invention are numerous, and inasmuch as the mode of application would be the same or substantially the same in every case I deem it sufficient to indicate briefly the various forms in which it may be used, indicating also the general mode of application in each case, and my detailed description will be directed to two principal forms in which I conceive the invention will be of the greatest utility.

Broadly stated, my invention involves the production of an alternating current in connection with a source of motive power. The periodicity of this current then corresponds in all its fluctuations to the fluctuations in speed of the source. I connect to the circuit in which this alternating current circulates two or more magnets or solenoids, each of which is included in a bridge-circuit of its own connected to the principal circuit, such bridge-circuits being what are known as "resonant circuits"—*i. e.*, containing condensers and self-induction coils so adjusted that each bridge-circuit will respond to and permit its solenoid or magnet to be affected by a particular frequency or periodicity in the main circuit. The tuned periodicity of these bridge-circuits is such that while one or more will respond when the periodicity of the current in the main circuit falls below that corresponding to the required speed of the source of power the other or others will respond to correspondingly greater periodicities. The solenoids or magnets I then connect either directly or indirectly by mechanical or electrical relaying to the source of power, so as to directly control its speed.

As prime movers to be regulated I apply my invention to steam-engines, to Pelton wheels, to electric motors driven by direct current, and to such other motors as may be regulated by controlling their sources of supply. I do not wish to limit myself, however, to any particular application, as the invention in its broadest sense lies in the method of regulation itself.

With regard to the steam-engine I substitute my governor for the ordinary centrifugal governor controlling the cut-off. In the case of the Pelton wheel or other water-motor I control the water-supply mechanism. In the case of the direct-current motor, which may be shunt wound, I preferably alter the resistance of the field. The manner of carrying out these various applications will be sufficiently obvious to those skilled in the art in view of the following detailed description, which will be directed to the two cases in which, first, an alternator driven by a Pelton wheel furnishes current to the controller, which reacts on the water-supply, and, second, in which a direct-current shunt-wound motor is controlled by altering the resistance of its field-circuit.

Figure 2:
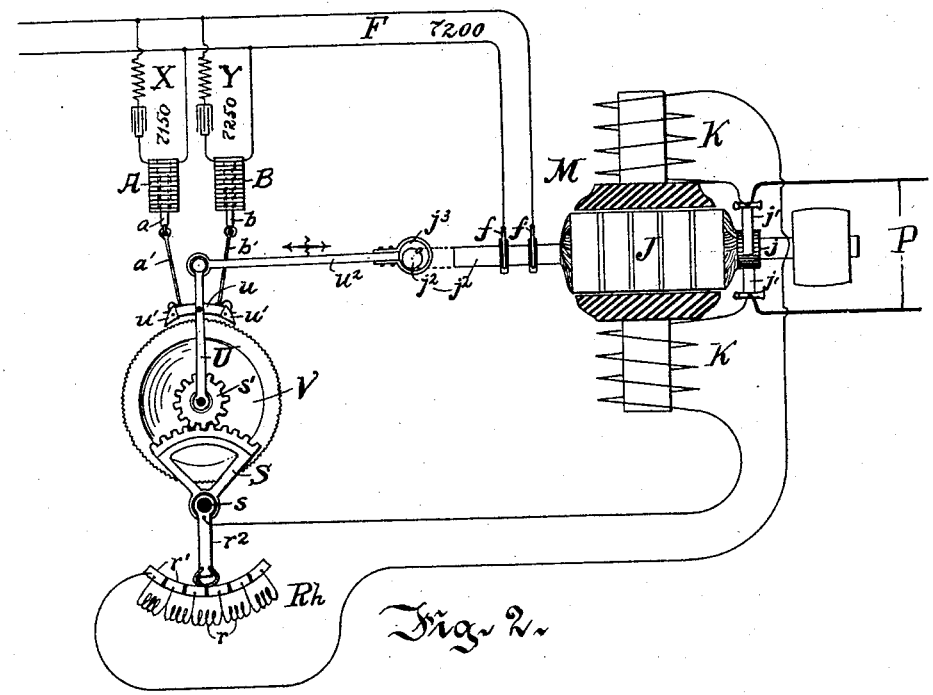

Referring to the accompanying drawings, in which the same letters of reference indicate the same parts throughout, Figure 1 is a diagraphic representation of an alternator-belt driven by a Pelton wheel and supplying consumption-circuits through main feeders, across which I connect my resonant circuits. Fig. 2 is a diagraphic representation of a direct-current motor, showing its power-circuit and an auxiliary circuit fed with alternating current taken from the armature-coils of the motor, said auxiliary circuit carrying in parallel the controlling-solenoids for a rheostat in the field-circuit.

Referring to Fig. 1, G is the generator. F F are the two sides of the main-feeder circuit leading therefrom. C C are the sides of the consumption-circuit. Connected across the main-feeder circuit I have shown four resonant circuits X X' Y Y'. Included in these circuits are the magnets A A' B B'. Each circuit is tuned through the medium of an impedance-coil *i* and a condenser *c* to respond to a particular periodicity. Pivoted at $p$ is an armature L, connected through the medium of a link $l$ to an arm $l'$, rigidly connected to the nozzle N of the wheel W. We will suppose the periodicity of the current in the main feeders corresponding to the required speed of the generator, and consequently of the wheel, to be seven thousand two hundred alternations per minute. The circuit X is tuned to allow current to pass at seven thousand three hundred, the circuit X' at seven thousand two hundred and fifty, the circuit Y at seven thousand one hundred and fifty, and the circuit Y' at seven thousand one hundred alternations per minute. The effect of this arrangement will be that if the speed of the generator increases so as to increase the periodicity on the line above the normal of seven thousand two hundred current will commence to pass through the circuit X' and the solenoid or magnet A', which will reach its maximum at seven thousand two hundred and fifty alternations. The solenoid or magnet A' will then act to draw up its end of the armature L, which will throw the arm $l'$ to the left, and by moving the nozzle N radially away from the periphery of the wheel will necessarily decrease the amount of water striking the buckets and consequently the speed of the wheel. Supposing the cause which is responsible for the increase of speed to be one of a sudden nature, such as an instantaneous cutting out of a large part of the load on the consumption-circuit, the frequency might continue to increase at a rate so rapid that the inertia inherent in the governor connections would preclude a sufficiently rapid response. In such case the circuit X would commence to take current just as the circuit X' commenced to lose current on the rise, and the maximum current would flow through the solenoid A at seven thousand three hundred alternations; but the solenoid A, it will be observed, has a greater leverage than the solenoid A', and its action would not only reinforce that of A', but should be sufficient effectually to change the speed of the motor. Of course still other circuits might be added, with their magnets or solenoids, as required. It will be obvious that on any sudden increase in load, and consequent speeding down of the generator and motor, the circuits Y Y' would respond to a decreasing frequency in exactly the same manner as the circuits X X' to an increasing one, with the effect, however, of throwing the nozzle N radially inward, tending to increase the speed of the motor. Normally the nozzle would be set to occupy an intermediate position, and as long as the periodicity on the feeders showed a very small variation the amount of current leaking through the resonant circuits, if appreciable, would be equally balanced and would produce, therefore, no effect.

In practice instead of employing the mechanism shown in Fig. 1 to control the nozzle of the wheel it will probably be found necessary to employ mechanical devices, driven from the shaft of the wheel or otherwise, substantially like those shown in Fig. 2.

Referring to Fig. 2, P is a power-circuit supplying a direct current to drive the motor M. I have shown the field K and the armature J diagraphically, and they can be of any well-known construction. Included in the circuit of the field, which is shunt fed from the brushes $j'$ on the commutator $j$, is a rheostat R$h$. This rheostat may be of any well-known form; but for purposes of illustration I have shown it as consisting of coils $r$, bridging contacts $r'$. Sweeping over these contacts is an arm $r^2$, carried on a shaft $s$, controlled directly by a toothed segment S, with which meshes a pinion $s'$, rigidly attached by means of an intermediate shaft or otherwise to the creeper-wheel V. Concentrically pivoted but independent of the wheel V is a radial arm U, carrying a rocker-arm $u$, having spring-pressed pivoted pawls $u'$. Connected to opposite ends of the rocker $u$ by means of links $a'$ $b'$ are the cores $a$ $b$ of solenoids A B, respectively, included in resonant circuits X Y, fed in parallel by main circuit F. The circuit F terminates at two brushes $ff'$, resting on collector-rings carried on the shaft of the armature J. These collector-rings are to be connected with a single coil, with opposite coils, or in any other preferred manner with the armature J. The only requirement is that an alternating current shall circulate in the circuit F. Normally, of course, this current would be zero, inasmuch as the two short resonant circuits X Y are to be so tuned as to prevent the passage of any current but one having a periodicity above or below that which would correspond to the desired speed of the motor. Carried on the shaft $j^2$ of the armature J or otherwise constantly driven is an eccentric $j^3$, connected by a link $u^2$ to the radial arm U.

The effect of the foregoing will be as follows: Suppose the speed of the armature to be normally such that if the circuit F were closed an alternating current having a periodicity or frequency of seven thousand two hundred per minute would circulate therein, and suppose that the circuit X is tuned to admit the passage of an alternating current having a periodicity of seven thousand one hundred and fifty alternations per minute and the circuit Y to correspondingly respond to a periodicity of seven thousand two hundred and fifty. Now if the speed of the motor should increase current would commence to flow through the solenoid B, which would draw up its core and, elevating its end of the rocker $u$, permit the creeper-wheel to be stepped around to the left in the figure, carrying with it the pinion $s'$, which would turn the segment S to the right, cutting out one or more of the coils of the rheostat R$h$ in the field-circuit, thus cutting down the speed of the motor.

It will be understood that the radial arm U is being constantly vibrated by the eccentric $j^3$ through the link $u^2$, but has no effect upon the creeper-wheel B unless one or the other end of the rocker $u$ be elevated so as to cause the corresponding pawl to engage with the periphery thereof.

Having thus described my invention and indicated the various uses to which it may be put, what I claim, and desire to secure by Letters Patent of the United States, is—

1. The method of governing the speed of a source of power which consists in generating a periodic current thereby and causing changes in the period of said current to react on the source of supply of said source of power substantially as described.

2. The method of governing the speed of a source of power which consists in generating an alternating current by means of such source of power and causing an increase or decrease in the periodicity of said alternating current to react through tuned resonant circuits to control the speed of the source of power, substantially as described.

3. A source of power, a circuit fed by periodic current generated from said source of power and means controlled by said circuit for maintaining constant the speed of said source of power, said means being operated upon changes in the period of said current, substantially as described.

4. An electric governor for prime movers consisting of the following instrumentalities, viz:—a generator of alternating current driven by the prime mover and having a normal periodicity corresponding to the normal speed; tuned resonant circuits adapted to permit the passage of current only at periodicities greater or less than the normal periodicity, connected to the circuit of said generator; and means included in said resonant circuits so connected as to increase or decrease the speed of the prime mover, substantially as described.

5. A governor for prime movers consisting of the following instrumentalities: an alternating-current generator driven by the prime mover; a main circuit connected to said generator and fed therefrom with current having a normal periodicity; a resonant circuit or circuits connected to said main circuit and so tuned as to respond only to periodicities greater or less than the normal periodicity; magnetic actuating devices included in said resonant circuits; and means controlled by said magnetic actuating devices for increasing or diminishing the supply of the prime mover, substantially as described.

6. An electric governor for a source of power consisting of the following instrumentalities: an alternator driven by said source of power and supplying a current having a normal periodicity to a main circuit; said main circuit; tuned resonant circuits connected to said main circuit and adapted to permit the passage of current only of periodicities greater or less than the normal periodicity, and means controlled by said resonant circuits to directly regulate the supply of the prime mover, substantially as described.

7. An electric governor for prime movers consisting of the following instrumentalities: an alternator driven by said prime mover, a main circuit fed from said alternator with current having a normal periodicity; resonant circuits connected with said main circuit and so tuned as to permit the passage of current through them only at periodicities greater or less than the normal periodicity; electromagnets or solenoids included in said resonant circuits; constantly-moving reversible mechanical means adapted to shift the controlling means for the source of supply of the prime mover; and suitable connections between said electromagnets or solenoids and said constantly-moving reversible mechanical means whereby the passage of current through one or the other of the resonant circuits upon an increase or decrease in the periodicity of the main-circuit current will operate to cause such shifting of the controlling means for the prime-mover supply, substantially as described.

KEMPSTER B. MILLER.

Witnesses:
EDWD. E. CLEMENT,
WM. H. DE LACY.